United States Patent [19]

Bernard

[11] 3,718,857

[45] Feb. 27, 1973

[54] TESTING DEVICE FOR DIFFERENTIAL AMPLIFIERS

[75] Inventor: Marcel Bernard, Angers, France

[73] Assignee: Societe Industrielle Honeywell Bull (Societe Anonyme), Paris, France

[22] Filed: May 24, 1971

[21] Appl. No.: 146,404

[30] Foreign Application Priority Data

May 29, 1970 France.................................7019839

[52] U.S. Cl..............324/57 R, 324/57 PS, 324/188, 330/2
[51] Int. Cl. ............................................G01r 27/00
[58] Field of Search.........324/57 R, 57 PS, 183, 185, 324/188; 330/2

[56] References Cited

UNITED STATES PATENTS

| 3,581,198 | 5/1971 | Shoemaker et al. | 330/2 X |
| 3,430,152 | 2/1969 | Walsh | 330/2 |
| 3,431,490 | 3/1969 | Kwap et al. | 324/57 R |
| 3,555,415 | 1/1971 | Shoemaker et al. | 330/2 X |
| 3,559,193 | 1/1971 | Savaglio et al. | 330/2 X |
| 3,586,969 | 6/1971 | Rudissill, Jr. | 330/2 X |

OTHER PUBLICATIONS

Woelkers, Circuit for Measuring the Turnon and Turnoff Delays of a Test Unit, IBM Technical Disclosure Bulletin, July 1964, pp. 130, 131.
Woodard, Time Delay Measuring System, IBM Technical Disclosure Bulletin, pp 1541, 1542, April 1967.
Plumb, Teamwork Streamlines Differential Amplifier Tests, Electronics, Sept. 15, 1969, pp 132–135.

Primary Examiner—Stanley T. Krawczewicz
Attorney—Ronald T. Reiling, Fred Jacob and Lewis P. Elbinger

[57] ABSTRACT

A device for verifying the response time of a differential amplifier, wherein recurrent pulses are applied to input terminals of a differential amplifier under test and a visual testing instrument is coupled to respond to such input pulses and the consequent output pulses of the amplifier to provide a display of the response time of the amplifier, and wherein a signal is applied between the two input terminals of the amplifier to effectively cancel the unbalanced voltage between such two terminals in the absence of test pulses.

8 Claims, 8 Drawing Figures

TESTING DEVICE FOR DIFFERENTIAL AMPLIFIERS

BACKGROUND OF THE INVENTION

This invention relates to a testing device for verifying the response time of transistorized differential amplifiers and, more particularly, to devices of this type which are realized in the form of integrated circuits.

Differential amplifiers must usually meet a set of severe specifications to be used with assurance in modern, high performance electronic circuits. The testing devices of the prior art usually employed for verifying that these specifications are met are quite complex, and, therefore, are bulky and of costly construction. Moreover, they most often lack flexibility and thus can be operated only with a single type of visual testing instrument.

Accordingly it is the object of the present invention to provide a testing device for verifying the response time of differential amplifiers that is relatively simple in construction, reasonably compact, and demonstrates a certain degree of flexibility in use.

The testing device of the invention is intended to be operated with various visual indicating means. In a first instance, the device can be connected to an oscilloscope to perform two successive measurements of response time upon the application of suitable signals to the input terminals of the amplifier under test. In a second instance, the device can be connected to automatic apparatus which enables simultaneously performing the above-mentioned two measurements, resulting in an additional saving of time.

SUMMARY OF THE INVENTION

In accordance with the invention, a testing device is provided for measuring the response time of a transistorized differential amplifier upon the application of a recurrent transient signal to one of its two signal input terminals. The testing device comprises connection means providing access to first and second signal input terminals, a signal output terminal, and a control input terminal of an amplifier to be tested, and further providing suitable voltages of proper polarity to such amplifier. The testing device further comprises circuit means for coupling the second signal input terminal and the signal output terminal in an inverse feedback loop to effectively cancel the unbalanced voltage between the two input terminals in the absence of an input signal. A generator of recurrent signal pulses is connected to apply such signal pulses to the first signal input terminal of the amplifier under test, each such signal pulse having a duration much shorter than its recurrence period. In addition, the testing device comprises means for connecting the first signal input terminal and the signal output terminal of the amplifier under test to visual testing instruments.

Each amplifier of the type under consideration is provided in the form of a module pluggable into the sockets of a suitable support of the testing device. This amplifier is provided with a control input terminal for receiving a suitable voltage pulse which during its presence, inhibits the operation of the amplifier. The signal pulse generator is adapted to apply inhibiting pulses to the control input terminal concurrently with the signal pulses applied to the first signal input terminal. The above-described arrangement can be operated, as such, with an automatically controlled apparatus provided for this purpose.

In the instance wherein the testing device is utilized in association with a dual-beam oscilloscope, switching means are provided for coupling a first vertical input terminal of the oscilloscope either to the first signal input terminal of the amplifier or to the control input terminal thereof. The second vertical input terminal of the oscilloscope continues to be connected to the output terminal of the amplifier. During a first measurement, the visual displaying of the output signal enables rapidly evaluating the response time in relation to the trailing edge of an input pulse, and during a second measurement, the visual displaying of the output signal enables evaluating the response time in relation to the trailing edge of an inhibiting pulse.

BRIEF DESCRIPTION OF THE DRAWING

The invention will be described with reference to the accompanying drawing, wherein.

DESCRIPTION OF THE PREFERRED EMBODIMENT

Figure 1:
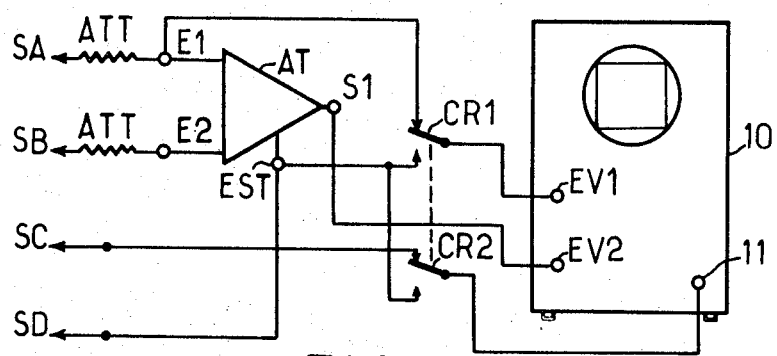
FIG. 1 is a simplified schematic diagram of an arrangement for measuring response time, according to the invention.

FIG. 1 illustrates in part a measuring arrangement in which are represented symbolically only a differential amplifier AT to be tested, switches CR1 and CR2, and a dual-beam oscilloscope 10. The testing device proper is not shown in this figure.

During a first measurement switches CR1 and CR2, manually actuated and mechanically coupled, are in the position shown in the figure. At this time a first signal input terminal E1 of the amplifier AT under test is connected to a first vertical input terminal EV1 of oscilloscope 10. During this time input terminal E1 receives test pulses through a means ATT, shown symbolically as a resistor, but which, in actuality, consists of a calibrating and attenuating apparatus which is described in detail hereinafter. The second signal input terminal E2 of amplifier AT also receives a series of test pulses through another means ATT, which is similar to the above-mentioned means ATT.

Signal output terminal S1 of amplifier AT is connected directly to the second vertical input terminal EV2 of the oscilloscope. The multiple generator which furnishes the above-mentioned test pulses also generates synchronization (sync) pulses, which are transmitted by switch CR2 to a synchronization (sync) input terminal 11 of the oscilloscope and which trigger the horizontal sweep at desired times.

This multiple generator also generates inhibiting pulses, termed "strobe" pulses which are applied to a control input terminal EST of amplifier AT. These inhibiting pulses are only displayed during the second measurement; i.e., when the movable contacts of switches CR1 and CR2 occupy their opposite positions, wherein the first vertical input terminal EV1 is connected to control input terminal EST. When switch CR2 is reversed, the inhibiting pulses are applied to sync input terminal 11 of oscilloscope 10.

Figure 2:
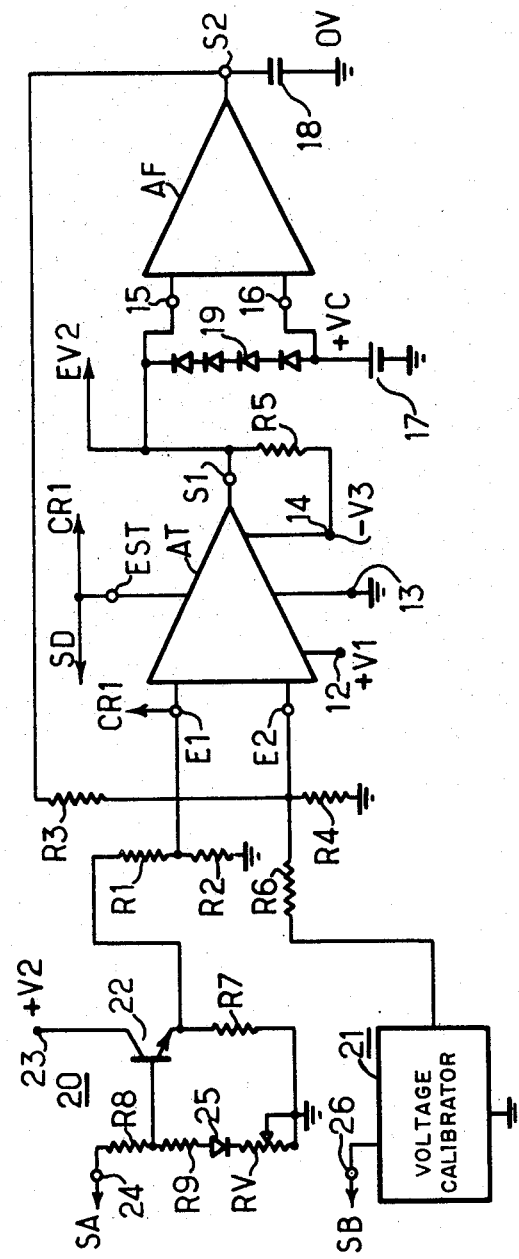
FIG. 2 is a schematic diagram of an adaptation board which is part of the testing device.

The actual structure of the testing device will be explained by reference to Figs. 2 and 3. Figure 2 is a schematic diagram of a testing board whose physical realization may vary according to need. Nevertheless, such board will bear a module support provided with sockets disposed to receive the pins of a miniaturized integrated circuit module. Although certain modules of this type may incorporate two amplifiers, only the testing of a single differential amplifier will be considered herein. Therefore, the module to be tested has pins which correspond to first and second signal input terminals E1 and E2, a control input terminal EST, a signal output terminal S1, and supply terminals 12, 13 and 14. It is presumed that these supply terminals will be connected to suitable electric potential sources, such that terminal 12 receives a voltage +V1, for example of +12v terminal 13 receives a zero, or ground, voltage, and terminal 14 receives a voltage −V3, for example of −6v.

The testing board comprises an amplifier AF, also of the differential type, which is incorporated in an inverse feedback loop intended to compensate for the unbalanced or offset voltage across signal input terminals of the amplifier under test outside the repeated measurement periods. Thus, when no signal is applied to input terminals E1 and E2 of each amplifier under test, an unbalanced difference of voltage and current can exist between these two input terminals. While the unbalanced current may be negligible under certain conditions, it is important that the unbalanced voltage, which is variable although very weak, be cancelled during the relatively long interval separating two successive measurement periods.

For this purpose, output terminal S1 of the amplifier AT under test is connected to a first input terminal 15 of amplifier AF and output terminal S2 of amplifier AF is connected through a resistor R3 to second signal input terminal E2 of amplifier AT. A second input terminal 16 of amplifier AF is connected to a voltage source 17. Source 17, shown as a battery, must supply a stable regulated voltage +VC, with a value of +1.4v which is the value of voltage which normally should be present at output terminal S1 of amplifier AT in the absence of signals on the input terminals thereof. Assuming that amplifier AF is also supplied with suitable voltages of proper polarity, it actually compares the voltages received on its two input terminals. A capacitor 18 connected between output terminal S2 and ground performs an integration function.

Output terminal S1 is connected to terminal 14 through a load resistor R5. In order to prevent input terminals 15 and 16 from being subjected to an extremely large potential difference when an amplifier module AT is removed from the support, these input terminals are connected together by four silicon diodes, such as diodes 19, connected in series.

Input terminals E1 and E2 of amplifier AT are connected to ground through respective resistors R2 and R4. Resistors R2 and R4 have relatively small values of resistance, for example 10 ohms, in order that the effects of an unbalanced current, described above, be negligible.

In the voltage divider formed by resistors R3 and R4, the ratio of their resistances (R3/R4) is approximately 1000, considering the voltage gains in the loop of amplifiers AT and AF.

The means ATT of Fig. 1, as shown in Fig. 2, comprises two voltage calibrators, designated by the reference numerals 20 and 21, and the two voltage dividers formed respectively by resistors R1 and R2 and by resistors R6 and R4. Calibrator 20 comprises a transistor 22, whose collector is connected to a terminal 23, which is assumed to be connected to a source of steady voltage +V2, for example of +5v. The emitter of transistor 22 is connected to ground through a load resistor R7 and the series-connected resistors R1 and R2. The base of transistor 22 is connected to an input terminal 24 through a resistor R8 and to ground through a resistor R9, a diode 25, and a resistor RV connected in series. Diode 25 serves to compensate for temperature variations which may affect the base-emitter voltage of transistor 22.

The ratio of the resistances (R1/R2) of resistors R1 and R2 is approximately 100. When resistor RV has been suitably adjusted and input terminal 24 receives a positive pulse of 3.5v amplitude from an output terminal SA of the signal generator, the voltage developed across resistor R7 is 1.5v and that applied to input terminal E1 is 15 millivolts.

The ratio of the resistances (R6/R4) of resistors R6 and R4 is approximately 300. When calibrator 21 has been suitably adjusted and its input terminal 26 receives a positive pulse of 3.5v amplitude, the voltage developed at the output terminal of calibrator 21 is also 1.5v, but the voltage applied to input terminal E2 is only 5 millivolts.

The signal generator included in the testing device will be described by reference to FIG. 3. In this signal generator, a first group of circuits forms a multistable device 27 and another group of circuits forms a delay unit 28.

Multistable device 27 basically comprises two registers 29 and 30 interconnected by several logic circuits. Registers 29 and 30 are identical and each comprises four stages, or bit positions. Each such register may be of a type actually available in the form of integrated circuits of transistors. Each register stage is provided with one input terminal, such as input terminals 31 and 32, and one output terminal, such as terminals 33 and 34. The output terminals of register 30 are directly connected to the corresponding input terminals of register 29. For example, output terminal 34 of stage A2 is directly connected to input terminal 31 of stage A1. Registers 29 and 30 are so constructed such that the logical states at the input terminals are transferred to the corresponding output terminals when a positive clock pulse is applied to a common input terminal, such as terminals C29 and C30.

The output signals SA, SB, SC and SD of register 29 are utilized to furnish appropriate signals for the testing board previously described and for the visual testing instruments.

The different stable states of multistable device 27 are determined by logic circuits which appropriately connect the output terminals of register 29 to the input terminals of register 30. Thus, a NAND circuit ET1 has two input leads which are connected respectively to output terminals SA and SB. The output lead of NAND circuit ET1 is connected through an inverter 12 to the input terminal of stage C2. The designations of the logical circuits utilized herein are valid for positive binary logic, i.e. that binary logic wherein the value of the binary 1 is represented by a positive, or high level, voltage and wherein the binary zero is represented by a low level voltage, which may be zero or negligible in the logical circuit.

A single inverter 13 connects output terminal SB of stage B1 to the input terminal of stage A2. The output terminal SC of stage C1 is connected through an inverter 14 to the input terminal of stage D2. Finally the input terminal of stage B2 is connected to the output lead of a NAND circuit ET2. NAND circuit ET2 has three input leads, of which the first is connected through an inverter 11 to output terminal SA, the second is connected to the output lead of inverter 14, and the third is connected to the output terminal SD of stage D1.

Figure 3:
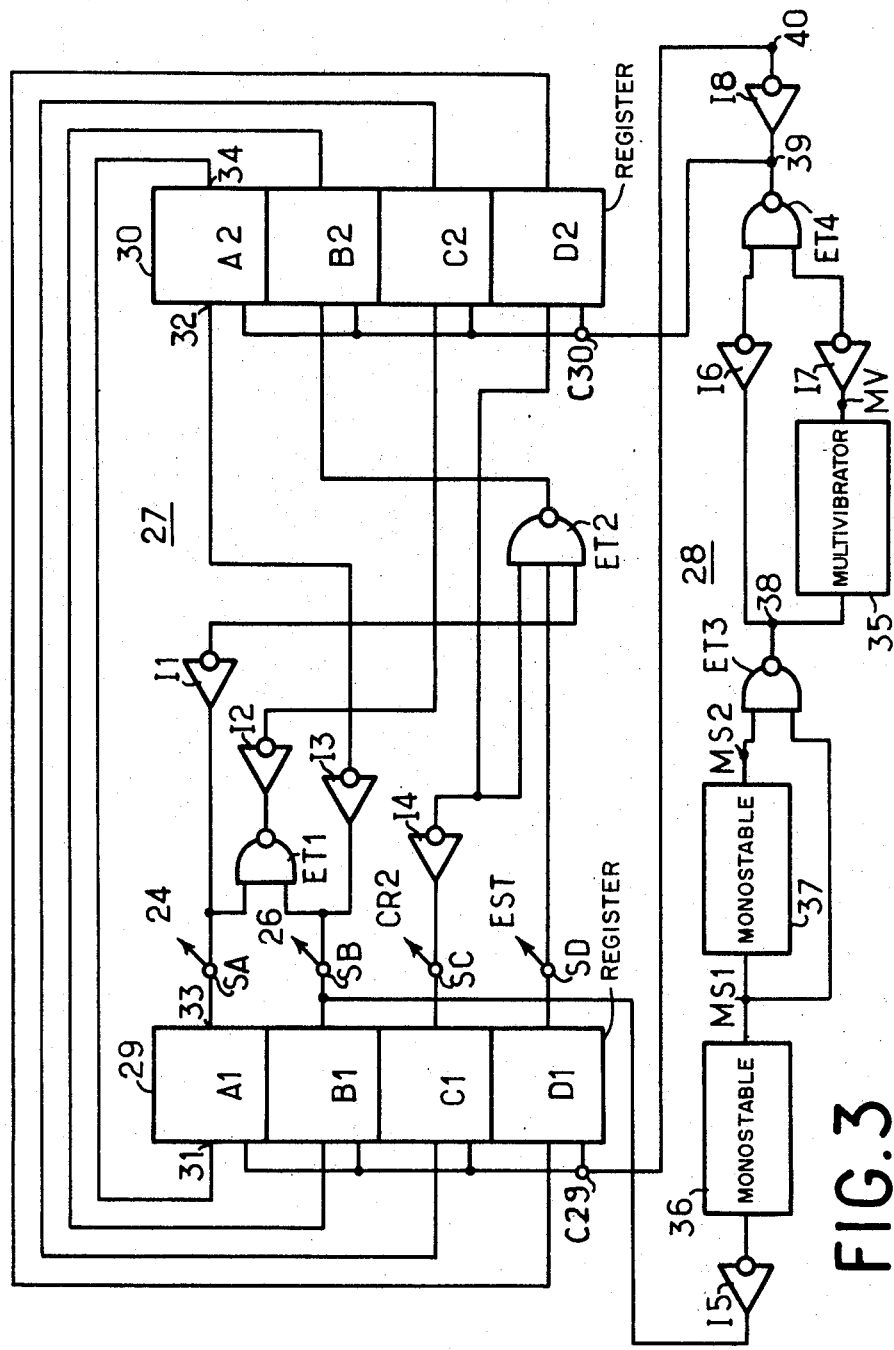
FIG. 3 is a logical schematic diagram of a signal generator adapted to be utilized in the testing device.

Delay unit 28 comprises basically an astable multivibrator 35, two monostable circuits 36 and 37 connected in succession and logic circuits connected as shown in Fig. 3. Output terminal SB of register 29 is connected through an inverter 15 to the input terminal of the first monostable 36. A NAND circuit ET3 has two input leads which are connected respectively to the output terminals of monostables 36 and 37. The output lead 38 of NAND circuit ET3 is directly connected to the input terminal of multivibrator 35 and is connected through an inverter 16 to one input lead of a NAND circuit ET4. The other input lead of NAND circuit ET4 is connected by an inverter 17 to the output terminal MV of multivibrator 35. The output lead 39 of NAND circuit ET4 delivers clock pulses to input terminal C30 of register 30. The output lead 40 of an inverter 18 delivers clock pulses, which are complementary to those delivered by NAND circuit ET4, to input terminal C29 of register 29.

Monostables 36 and 37 may be identical and of a well-known type wherein the output terminal delivers a positive output voltage when the monostable is in its rest state. The output voltage drops to a low level when the monostable input terminal is subjected to a step voltage of positive sense remaining at such low level during a quasi-stable state determined by a time-constant network.

Figure 4:
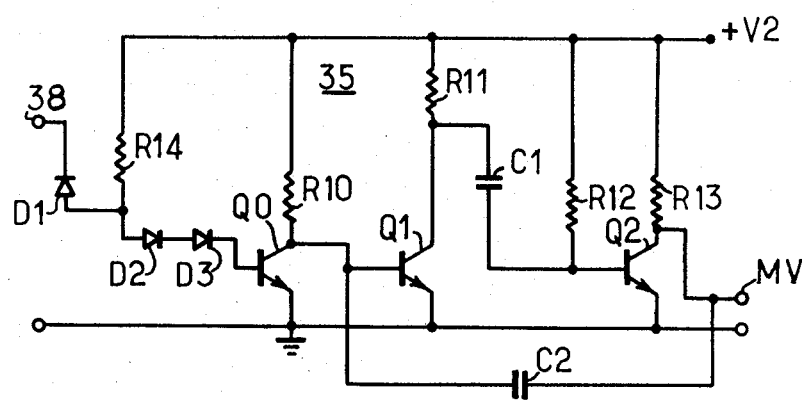
FIG. 4 is a schematic diagram of a multivibrator which is part of the signal generator.

The schematic diagram of multivibrator 35 is given by Fig. 4. This well-known circuit is supplied with a positive voltage $+V2$ and comprises basically two transistors Q1 and Q2, to which are connected resistors R10–R13 and capacitors C1 and C2. A transistor Qo served to block or unblock the multivibrator according to whether the voltage applied to terminal 38 is high or low. During the greater part of the time this voltage is +3.5v, which causes diode D1 to be cutoff and transistor Qo to receive through resistor R14 and silicon diodes D2 and D3 a base current sufficient for saturation. The collector voltage of transistor Qo is thereby sufficiently low to block, or cutoff, transistor Q1, so that transistor Q2 is saturated. However, at the start of a measurement period, which will be defined hereinafter, the voltage applied to terminal 38 becomes substantially zero, whereupon diode D1 draws all of the current furnished by resistor R14 and diodes D2 and D3 and transistor Q0 are cutoff. Multivibrator 35 is thereby unblocked and pulses appear at output terminal MV.

Figure 5:
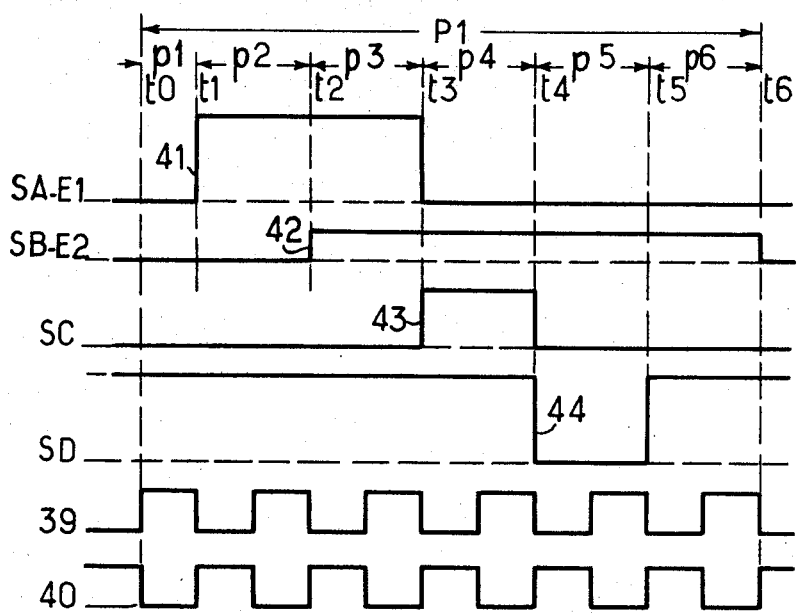
FIG. 5 is a timing diagram of signals furnished by the signal generator and signals present at certain points therein.

The general operation may be described in detail by reference to FIGS. 3, 5 and 6. The arrangement of the signal generator described above is such that when voltage is supplied thereto, multistable device 27 passes through a sequence of state changes which are immediately followed by a sequence of states, which are necessary for the continuous operation of the testing device.

Delay unit 28 provides the signal generator with a recurrence period of duration P2 (waveform 16) in which is included a measurement period of duration P1.

Figure 6:
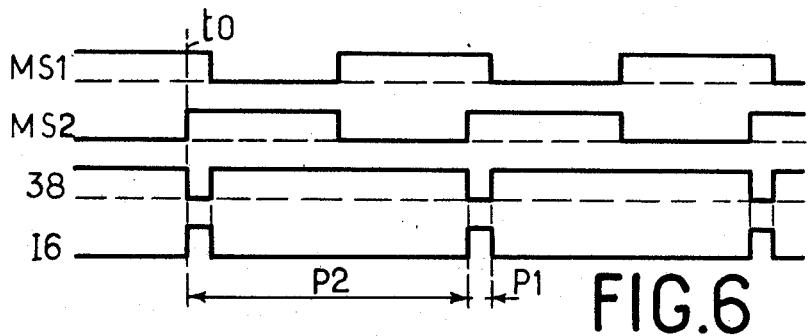
FIG. 6 is a timing diagram of signals present in a delay unit of the signal generator.

Assume, now, that at a time t0 monostable 37 returns to its rest state (waveform MS2, FIG. 6). The two input signals of NAND circuit ET3 are now at the positive, or high, level, whereupon the voltage on terminal 38 becomes zero, or approximately zero, and multivibrator 38 becomes unblocked. One input lead of NAND circuit ET4 is now at the positive level for the duration P1 (waveform 16). The other input lead of circuit ET4 receives the pulses generated by multivibrator 35, after inversion by inverter 17. Accordingly, NAND circuit ET4 delivers a first series of clock pulses (waveform 39), which are applied to register 30 of multistable device 27, and a second series of inverted clock pulses (waveform 40) which are applied to register 29.

The arrangement of multistable device 27 is such that a positive pulse of 3.5v appears at output terminal SA (waveform SA–E1, FIG. 5) and continues through periods p2 and p3, terminating at time t3. A second positive pulse of 3.5v then appears at output terminal SB at time t2, and continues until time t6. A third positive pulse of 3.5v next appears on output terminal SC from time t3 to time t4. Stage D1 of register 29 is specially designed so that the voltage on output terminal SD is normally at the level of $+V2$, or 5v, whereby a negative pulse of approximately 5v amplitude appears at output terminal 50 from time t4 through time t5.

At time t6, when output terminal SB returns to zero voltage, this step voltage of negative sense is transformed by inverter 15 to a positive step voltage, which triggers monostable 36. When the output signal MS1 of monostable 36 returns again to its high voltage level, the resulting positive step triggers the operation of monostable 37 (waveform MS2). The time-constant networks of monostables 36 and 37 are designed so that the total duration of the negative pulses they provide determines a period, termed "compensation period," of which the total duration is P2-P1. During this compensation period, the voltages at output terminals SA–SD do not vary. When, again the second monostable 37 returns to its rest state, a new measurement period starts.

Since output terminal SA, FIG, 3, is connected to input terminal 24 of calibrator 20, FIG. 2, the first signal input terminal E1 of the amplifier AT under test receives a positive pulse 41, reduced to 15 millivolts, during interval t1–t3 of each measurement period P1. If switches CR1 and CR2 are in the positions shown in FIG. 1, this received pulse is also applied to input terminal EV1 of oscilloscope 10.

Since output terminal SB is connected to input terminal 26 of calibrator 21, the second signal input terminal E2 of amplifier AT receives a positive pulse 42 of 5 millivolts during the interval $t2 - t6$ of each measurement period.

Since output terminal SC is connected to the upper contact of switch CR2, FIG. 1, the sync input terminal 11 of the oscilloscope receives a positive synchronization pulse 43 between times $t3$ and $t4$ of each measurement period.

Since output terminal SD is directly connected to the control input terminal EST of amplifier AT, the latter receives a negative inhibiting pulse 44 between times t4 and t5 of each measurement period.

Certain characteristics of the type of differential amplifier subjected to the testing described herein are as follows. As mentioned previously, output terminal S1 is normally at a voltage of +1.4v, termed the logic threshold level, when the input voltages are zero. A positive voltage of a few millivolts on input terminal E1, the "inverting" input terminal, reduces the output voltage to approximately −0.5v, whereas a similarly small negative voltage on the same input terminal causes the output voltage level to rise to approximately +4v. When these same input voltages are applied to input terminal E2, termed the "non-inverting" input terminal, voltage levels result on output terminal S1 which are the inverse of those previously described. However, amplifier AT is operative only when a voltage of +5v is applied to control input terminal EST. When the voltage on input terminal EST is reduced to zero, during an inhibiting pulse, amplifier AT becomes completely inoperative and the level of its output voltage remains at approximately −0.5v.

Figure 7:
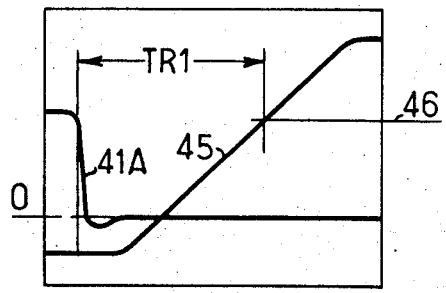
FIGS. 7 and 8 illustrate images visible on the reticule of the oscilloscope during two successive measurements.

During the first measurement operation switches CR1 and CR2 are in the position shown in Fig. 1, and there can be observed on the oscilloscope screen both the falling trailing edge 41A of input pulse 41, FIG. 7, and the trace 45 of the output voltage. Since horizontal time reference marks and vertical voltage level reference marks have been preinscribed on the screen, it is easy to evaluate the response time TR1 between pulse edge 41A and the instant when trace 45 crosses a level 46, which can be related to the logic threshold level previously described. Pulse edge 41A corresponds substantially to time $t3$ of FIG. 5 and the leading edge of pulse 43 of positive sense which triggers the horizontal sweep at the same instant.

The amplitude of pulse 41 is relatively great in order to produce a high degree of saturation in the semiconductors of the amplifier which are involved. The amplitude of pulse 42 is smaller, but is sufficient for the output voltage to reach its maximum level after the termination of pulse 41.

Figure 8:
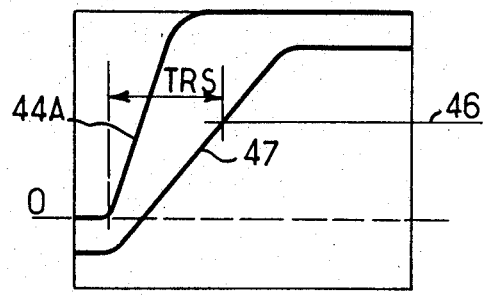

For performing the second measuring operation, the position of switches CR1 and CR2 are reversed. The only changes in the circuit are that input terminals EV1 and 11 of oscilloscope 10 now receive inhibiting pulse 44, FIG. 5. During the occurrence of the inhibiting pulse the output voltage of amplifier AT is reduced to approximately −0.5v At the termination of the inhibiting pulse, time $t5$, the amplifier returns to its operative state. The rear edge, of positive sense, of the inhibiting pulse triggers the horizontal sweep of oscilloscope 10 and there can then be observed, Fig. 8, both this rear edge 44A and the trace 47 of the output voltage. In a manner similar to that described previously, it is easy to evaluate the response time TRS between the beginning of the rise of pulse edge 44A and the instant when trace 47 crosses the logic threshold level 46.

For the type of differential amplifier considered herein, the maximum value of response time TR1 is fixed, for example at 50 nanoseconds, and that of response time TRS is fixed, for example at 20 nanoseconds. The two measurement operations each take only a few seconds.

In the symmetrical multivibrator 35 of FIG. 4, the duration of the clock pulses depends primarily on the equal resistors R10 and R12 and equal capacitors C1 and C2. For example, if the duration of a clock pulse is 1.8 microseconds, the total interval P1 of a measurement period is 19.8 microseconds. Moreover, the two monostables 36 and 37 of delay unit 28, FIG. 3, are designed so that the duration of the compensation period P2 − P1 is 560 microseconds. The recurrence period, therefore, is approximately 580 microseconds in the example presented. These values correspond to the condition that the recurrence period P2 of the signals applied to the input terminals of the amplifier under test be at least 20 to 25 times larger than the duration of the measurement period P1. The value of capacitor 18, Fig. 2, must be sufficiently great so that at output terminal S2, the compensating voltage of the unbalanced voltage of input terminals E1 and E2 varies very little during the course of a measurement period. There is sufficient time for the equilibrium of the input voltages to be re-established during the relatively long compensation period.

When the testing device is operated with automatic apparatus, the latter comprises special input terminals which are connected to input terminals E1 and EST and output terminal S1 of the amplifier under test, whereas the synchronization pulse provided at output terminal SC of the generator may or may not be employed according to the type of the automatic apparatus.

It is understood that a signal generator different from that described previously herein can be employed, provided that it is adapted to furnish signals having characteristics which are analogous to those defined herein.

Much that has been described in the foregoing and that is represented on the drawing is characteristic of the invention. It is evident that one skilled in the art can adduce all modifications of form and of detail using his judgment, without departing from the scope of the invention.

I claim:

1. A testing device for measuring the response time of transistorized differential amplifier upon the application of a transient signal to one of two signal input terminals of said amplifier, comprising in combination:

connection means providing access to a first and a second signal input terminal, to a signal output terminal and to a control input terminal of an amplifier to be tested, said connection means further applying suitable voltages of proper polarity to said amplifier;

circuit means for coupling said second signal input terminal and said signal output terminal in an inverse feedback loop to effectively cancel the unbalanced voltage between said two signal input terminals in the absence of an input signal;

a generator of recurrent signal pulses connected to apply said signal pulses to said first signal input terminal of said amplifier, each pulse having a duration much shorter than its recurrence period; and means for connecting said first signal input terminal and said signal output terminal of the amplifier under test to a visual testing instrument.

2. The testing device of claim 1, wherein said circuit means comprises a second differential amplifier providing a high gain and having a first input terminal connected to said signal output terminal of the amplifier under test, having a second input terminal receiving a comparison voltage, and having an output terminal connected through a voltage divider to said second signal input terminal of the amplifier under test.

3. A testing device for measuring the response time of transistorized differential amplifier upon the application of a transient signal to one of two signal input terminals of said amplifier, comprising in combination:

connection means providing access to a first and a second signal input terminal, to a signal output terminal and to a control input terminal of an amplifier to be tested, said connection means further applying suitable voltages of proper polarity to said amplifier;

circuit means for coupling said second signal input terminal and said signal output terminal in an inverse feedback loop to effectively cancel the unbalanced voltage between said two signal input terminals in the absence of an input signal, wherein said circuit means comprises a second differential amplifier providing a high gain and having a first input terminal connected to said signal output terminal of the amplifier under test, having a second input terminal receiving a comparison voltage, and having an output terminal connected through a voltage divider to said second signal input terminal of the amplifier under test;

a generator of recurrent signal pulses connected to apply said signal pulses to said first signal input terminal of said amplifier, each pulse having a duration much shorter than its recurrence period wherein said signal generator comprises a multistable device and a delay unit with reciprocal connections arranged such that said multistable device generates at a plurality of output terminals thereof a sequence of pulses, said sequence having a duration, termed "measurement period," which is no greater than 1/25th the duration of a period of recurrence; and means for connecting said first signal input terminal and said signal output terminal of the amplifier under test to a visual testing instrument.

4. The testing device of claim 3, wherein when a first type-pulse is applied to said first signal input terminal of the amplifier under test from a first output terminal of said multistable device, said first-type pulse terminating near a mid-point moment of each measurement period, a moment from which the response time can be observed at the output terminal of the amplifier.

5. The testing device of claim 4, wherein a second type pulse is applied to said second signal input terminal of the amplifier under test from a second output terminal of said multistable device and continues during at least the second half of said measurement period, and wherein a fourth output terminal of said multistable device is connected to apply to said control input terminal an inhibiting pulse during said second half of said measurement period, said inhibiting pulse terminating before the end of said measurement period and inhibiting the operation of the amplifier under test.

6. A system for testing differential amplifiers, comprising the testing device of claim 5 and a dual-beam oscilloscope, wherein said output terminal of the amplifier under test is connected to one of the vertical input terminals of said oscilloscope, a first switch connects said first signal input terminal of said amplifier to the other vertical input terminal of said oscilloscope, and a second switch connects a third output terminal of said multistable device to a synchronization input terminal of said oscilloscope during first measurement of said response time.

7. The system of claim 6, wherein said first and second switches are placed in a second position which connects the control input terminal of the amplifier under test to both of said other vertical input terminal and said synchronization input terminal of said oscilloscope during a second measurement of response time.

8. A testing device for measuring the response time of a differential amplifier, wherein said amplifier has a pair of input terminals and an output terminal, comprising in combination: signal generating means connectable to said amplifier for applying recurrent pulses to at least one of said input terminals, time delay measuring means connectable to said one input terminal and to said output terminal for measuring the time between each of said pulses and the consequent pulse delivered by said output terminal, and compensating means for applying a compensating voltage between said pair of input terminals to cancel the unbalanced voltage between said terminal pair in the absence of input signals to said terminal pair.

* * * * *